(12) United States Patent
Webb et al.

(10) Patent No.: US 7,207,512 B2
(45) Date of Patent: Apr. 24, 2007

(54) FOOD GRATING DEVICE AND IMPROVED HINGE MECHANISM

(75) Inventors: Terri Webb, Elmhurst, IL (US); Louis Chalfant, Russellville, AR (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 11/424,694

(22) Filed: Jun. 16, 2006

(65) Prior Publication Data

US 2006/0283994 A1    Dec. 21, 2006

Related U.S. Application Data

(60) Provisional application No. 60/691,369, filed on Jun. 17, 2005.

(51) Int. Cl.
  *A47J 17/00*   (2006.01)
  *A45C 13/22*   (2006.01)
(52) U.S. Cl. ............... 241/169; 241/273.1; 16/900; 16/438
(58) Field of Classification Search ............... 241/168, 241/169, 169.1, 273.1, 273.2, 273.3, 273.4, 241/95; 16/326, 900, 438, 324
  See application file for complete search history.

(56) References Cited

U.S. PATENT DOCUMENTS

| | | | |
|---|---|---|---|
| 365,158 | A | 6/1887 | Van Duzer |
| 659,144 | A | 10/1900 | Golden |
| 1,845,522 | A | 2/1932 | Rowley |
| 1,984,216 | A | 12/1934 | Howlett |
| D149,259 | S | 4/1948 | Daniels |
| D149,956 | S | 6/1948 | Lataner |
| 2,720,234 | A | 10/1955 | Fett |
| 2,786,503 | A | 3/1957 | Lewis |
| 3,628,845 | A | 12/1971 | Grimm |
| D230,241 | S | 2/1974 | Riddington |
| 4,403,373 | A * | 9/1983 | Kummerlin .................. 16/327 |

(Continued)

FOREIGN PATENT DOCUMENTS

CA        2112764 C      5/2004

(Continued)

OTHER PUBLICATIONS

OXO Good Grips Multi-Grater, Nov. 9, 2004, OXO International—Mulit Grater, http://www.oxo.com/catqalog/product_info.php?products_is=382.

*Primary Examiner*—Faye Francis
(74) *Attorney, Agent, or Firm*—Neal, Gerber & Eisenberg LLP

(57) ABSTRACT

The present invention comprises a food triturating device with a first extension, a second extension and a hinge device therebetween. The hinge device is located within a housing, and comprises a hinge bar, a rotating drum mounted on a hinge bar. The rotating drum is slidable between a first position and a second position and rotatable between any one of three rotating positions. The hinge also comprises a engagement wall positioned within the housing and having a shelf and at least one locking slots. A locking member is formed on the rotating drum and cooperates with the engagement wall to lock the rotating drum into any one of the three rotating positions with the rotating drum is in the first sliding position. A biasing spring, located within the housing, biases the rotating drum toward the first sliding position.

10 Claims, 6 Drawing Sheets

U.S. PATENT DOCUMENTS

| | | |
|---|---|---|
| 4,501,045 A | 2/1985 | Boyer |
| 4,718,127 A * | 1/1988 | Rittmann et al. .............. 2/424 |
| 4,805,843 A | 2/1989 | Draper |
| 5,100,506 A | 3/1992 | Sturtevant et al. |
| 5,101,720 A | 4/1992 | Bianchi |
| 5,185,790 A | 2/1993 | Mischneko |
| 5,259,019 A | 11/1993 | Stilley |
| D347,149 S | 5/1994 | Feer et al. |
| 5,312,054 A | 5/1994 | Feer et al. |
| 5,317,785 A | 6/1994 | Kobayashi |
| D354,886 S | 1/1995 | Diefenbach |
| 5,586,363 A | 12/1996 | Fanuzzi |
| D378,336 S | 3/1997 | Pedrini |
| 5,640,690 A | 6/1997 | Kudrna |
| D389,019 S | 1/1998 | Molo |
| 5,711,491 A | 1/1998 | Molo |
| 5,813,093 A | 9/1998 | Giordano, Jr. et al. |
| 6,070,494 A | 6/2000 | Horng |
| 6,318,652 B1 | 11/2001 | Liu |
| D476,864 S | 7/2003 | Daldosso |
| D491,774 S | 6/2004 | Brousseau et al. |
| 6,766,972 B1 | 7/2004 | Prommel et al. |
| D494,026 S | 8/2004 | Brousseau et al. |
| D498,650 S | 11/2004 | Boilen |
| 6,860,441 B2 | 3/2005 | Richardson |
| 2003/0089832 A1 | 5/2003 | Gold |
| 2004/0217219 A1 | 11/2004 | Di Bitonto et al. |

FOREIGN PATENT DOCUMENTS

| | | |
|---|---|---|
| GB | 1444556 | 8/1976 |

* cited by examiner

FOOD GRATING DEVICE AND IMPROVED HINGE MECHANISM

CROSS-REFERENCE

This invention claims the priority of U.S. Provisional Patent Application No. 60/691,369 filed on Jun. 17, 2005. This prior application is incorporated herein by reference.

BACKGROUND OF THE INVENTION

This invention relates to an apparatus for grating food products as well as a hinge mechanism to connect arms of an apparatus in multiple fixed positions.

SUMMARY OF THE INVENTION

An apparatus for grating food products, such as cheese, is disclosed herein. The apparatus comprises a pair of arms that are fixable in different positions to enable the apparatus to be easily used in different manners, and to be easily collapsed into a storage position. An improved hinge mechanism that may be used in connection with other devices is also disclosed. The details of this invention are set forth below in connection with the detailed description of the embodiments.

DETAILED DESCRIPTION OF THE DRAWINGS

Figure 1:
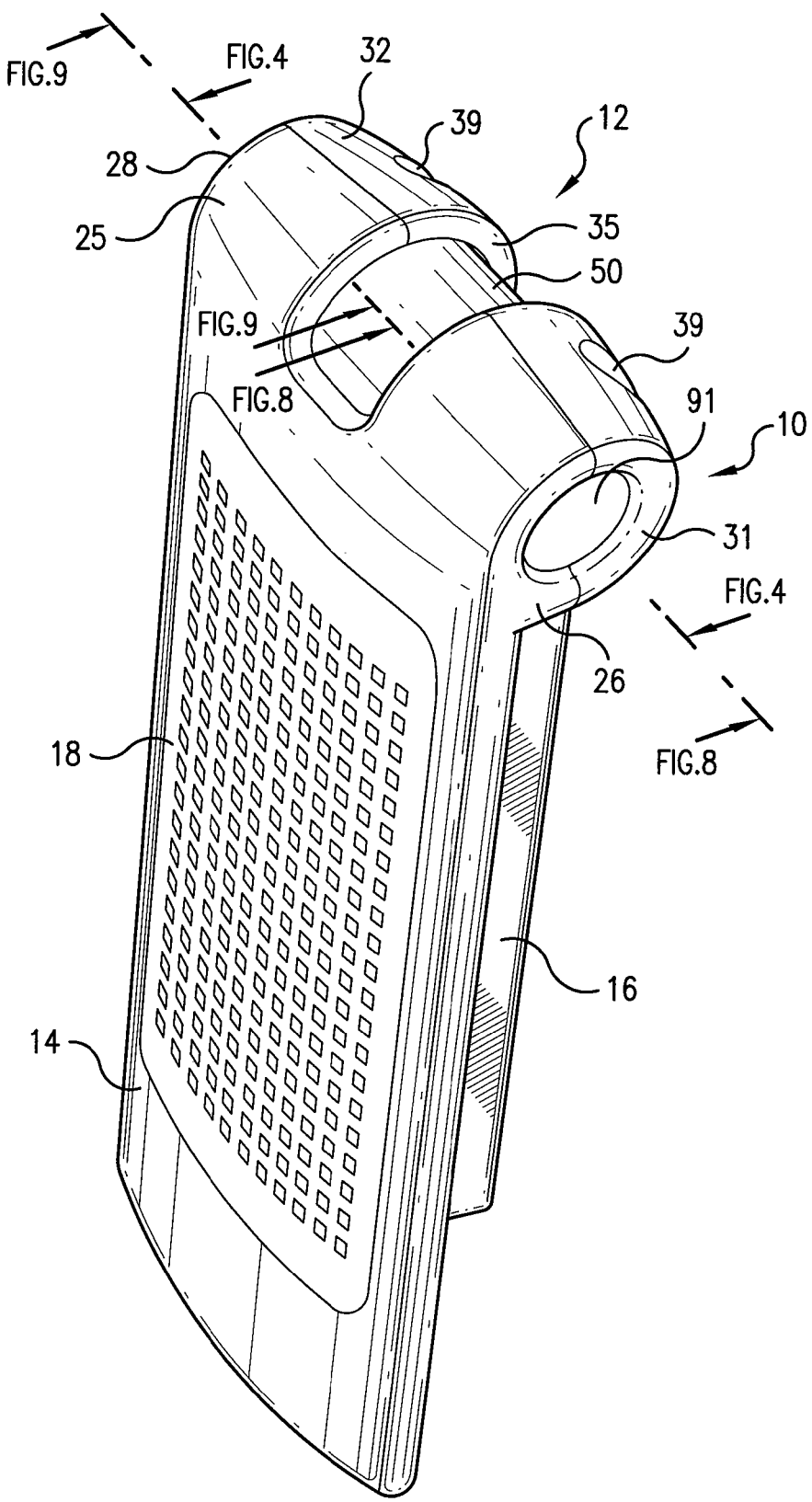
FIG. 1 is an isometric view of an exemplary cheese grater in accordance with one embodiment of the present invention, with the handle in a first, closed position.

FIGS. 1–7 depict an exemplary food grater 12 having a main body member 14 and handle member 16 connected by means of hinge assembly 10. In the embodiment depicted, main body member 14 has a food grating surface 18 attached thereto. Handle member 16 comprises gripping portion 20, neck portion 15 and rotating drum 50. Indented area 22 is formed on gripping portion 20 for ease of handling, as the user may place a thumb there when holding the gripping portion 20.

Figure 2:
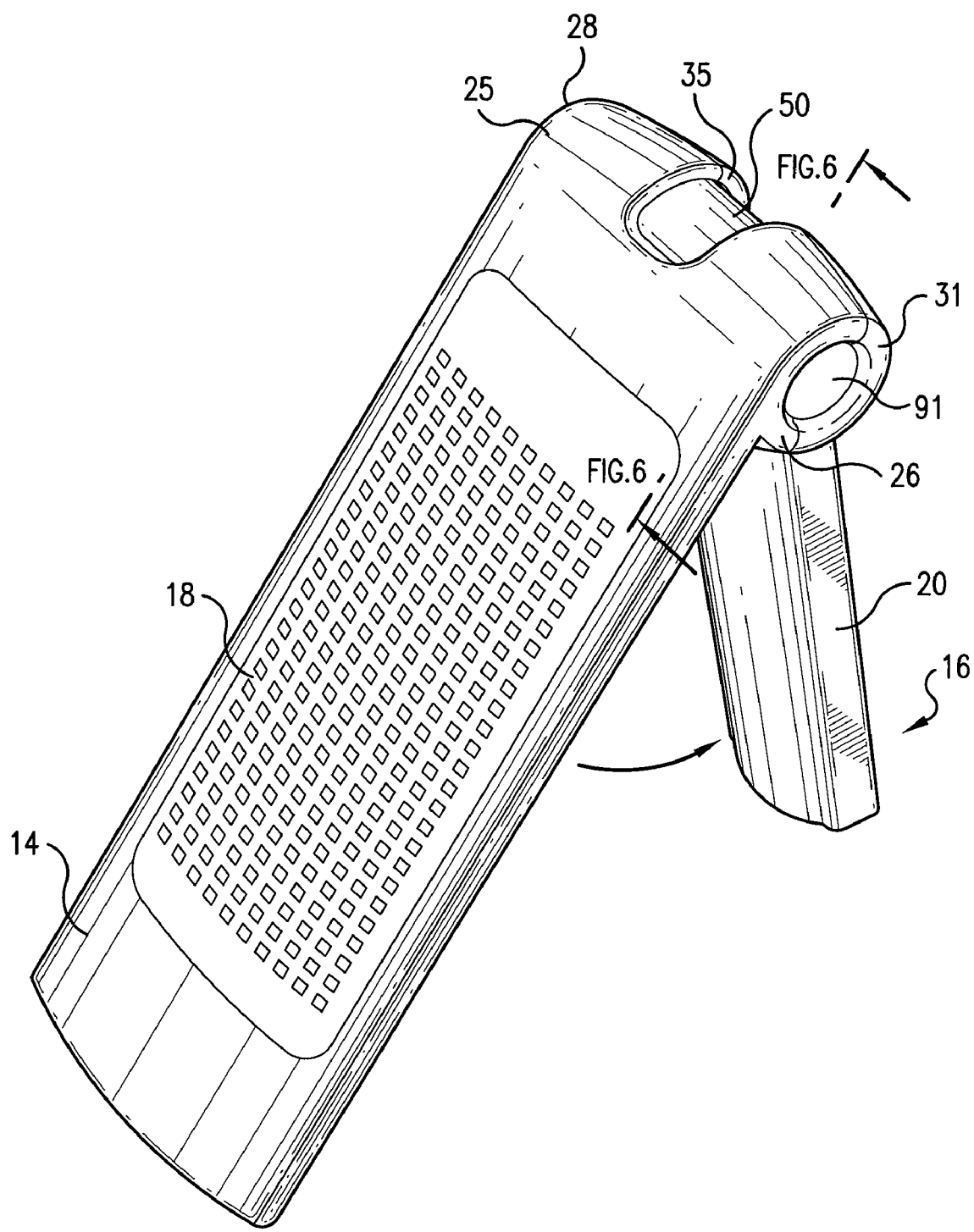
FIG. 2 is an isometric view of the cheese grater of FIG. 1, with the handle in a second position.
Figure 3:
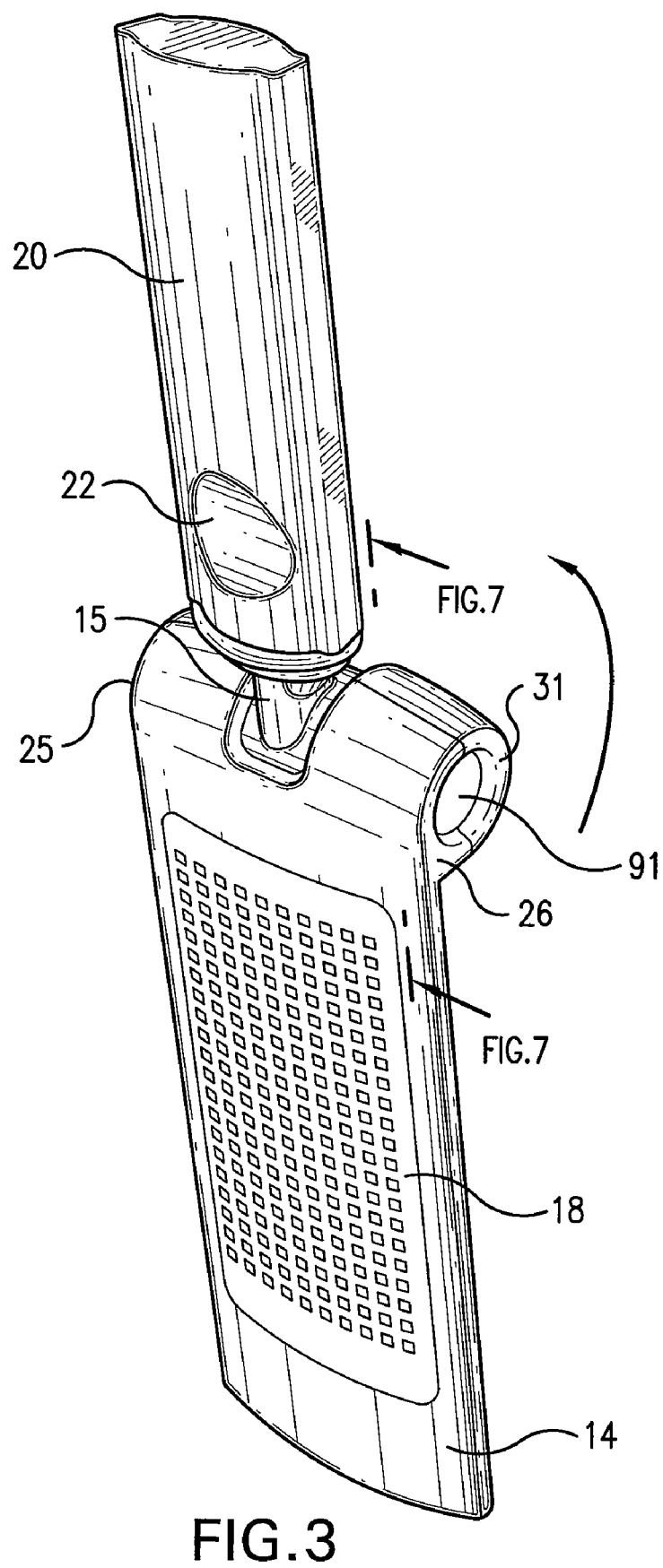
FIG. 3 is an isometric view of the cheese grater of FIG. 1, with the handle in a third position.

Grater 12 has at least three different positions, which are achieved by the rotation of handle member 16 through the hinge mechanism 10 to be described below. The first, or closed, position is depicted in FIG. 1, where handle member 16 is adjacent the back surface of grating surface 18. This permits grater 12 to be stored without taking up a significant amount of space. The second position is shown in FIG. 2, where handle member 16 is at a sufficient angle to main body member 14 to permit grater 12 to stand on its own on a table, plate or other surface. The user can still hold grater 12 by holding the gripping portion 20 of handle member 16 in this configuration. The third position is shown in FIG. 3, where handle member 16 is extended parallel to main body member 14 and grating surface 18; this configuration is particularly helpful if the user wishes to grate the food product into a larger bowl or other area.

It will be appreciated by those in the art that the figures depict an exemplary embodiment rather than a limiting one. For example, this apparatus is described as a food grater but other applications are possible. Grating surface 18 may also be removably attached to permit different grating or slicing surfaces to be used with the apparatus, and handle member 16 may comprise different shapes than gripping portion 20. Moreover, hinge assembly 10 has many applications and is not limited to applications such as food grater 12, nor is it limited to use with food-related utensils, as there are industrial applications for such assemblies.

Curved portion 25, having a first end 26 and a second end 28, is formed at one end of main body member 14. Cavity 36 is formed within curved portion 25. Caps 31 and 32 are removably secured to curved portion 25 proximate to first end 26 and second end 28, respectively. Cap 31 comprises circular element 91, while cap 32 comprises circular element 92.

Groove 35 is formed between first end 26 and cap 31 on the one side, and second end 28 and cap 32 on the other side. Groove 35 is sized to accommodate neck portion 15 to permit handle member 16 to move between the first, second and third positions as described herein.

In the embodiment depicted, curved portion 25 is integrally formed as part of main body member 14; other means of securing curved portion 25 to main body member 14 are within the scope of the invention. Similarly, caps 31 and 32 are removably secured to curved portion 25 by means of screws (not shown) threaded into openings 39; covers (not shown) may be used to enclose the screws to provide a smooth outer surface of caps 31 and 32. It will be understood that caps 31 and 32 may be removably secured by other means such as snaps, a tongue-in-groove arrangement, etc. It will also be appreciated that the depicted embodiment is exemplary only, rather than limiting, and it is within the scope of the present invention that curved portion 25 and caps 31 and 32 may be replaced by a number of variations.

Figure 4:
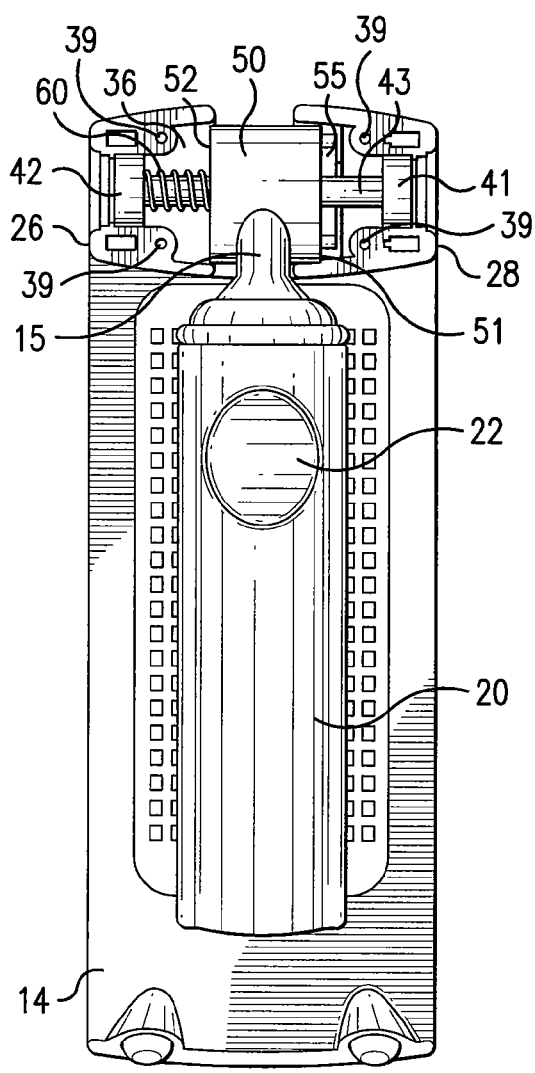
FIG. 4 is a bottom plan view of the cheese grater of FIG. 1, with portions of the housing removed to show the hinge mechanism, and with the handle in the first closed position and the hinge mechanism in the locked position.
Figure 5:
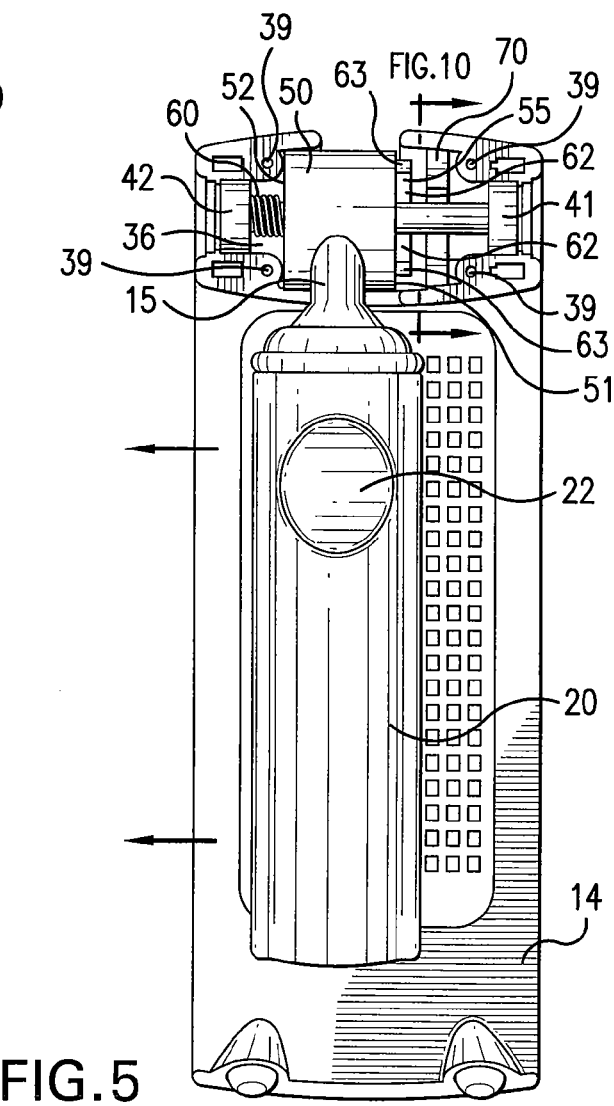
FIG. 5 is a bottom plan view similar to FIG. 4, with the hinge mechanism moved to the rotating position.

As shown in FIGS. 4 and 5, hinge assembly 10 comprises first collar 41 located in cavity 36 near first end 26 and second collar 42 located in cavity 36 near second end 28. Hinge bar 43 comprises a first end 44, which is secured within first collar 41, and a second end 45, which is secured within second collar 42.

Rotating drum 50, having a drum first end 51 and a drum second end 52, is preferably an integral part of handle 16 and is mounted on hinge bar 43. Biasing spring 60 is located on hinge bar 43 between drum second end 52 and second collar 42. As can be seen by a comparison of FIGS. 4 and 5, rotating drum 50 (and therefore handle member 16) is slidably mounted on hinge bar 43 and is movable between a first, locked position shown in FIG. 4, and a second, rotatable position shown in FIG. 5. Moving rotating drum 50 to the second, unlocked position enables the user to rotate neck portion 15 of handle member 16 through groove 35 to move handle member 16 to the different operating positions described herein. Biasing spring 60 is positioned such that it biases rotating drum 50 to the first, locked position.

A locking member 55 is formed on drum first end 51. As shown, for example, in FIG. 5, locking member 55 comprises a body portion 62 and end portions 63. In the depicted embodiment, body portion 62 is formed about hinge bar 43. Because the width of body portion 62 is less than the diameter of hinge bar 43, body portion 62 appears to be two separate pieces. It will be appreciated by those in the art that the depicted embodiment of locking member 55 is exemplary rather than limiting. For example, the width of body portion 62 may be greater than the diameter of hinge bar 43. Also, locking member 55 may solely comprise body portion 62, and not end portions 63, or solely comprise end portions 63 and not body portion 62. Finally, as described below, when cap 31 is attached to curved portion 25, locking member 55 need not extend to both sides of hinge bar 43.

Figure 11:
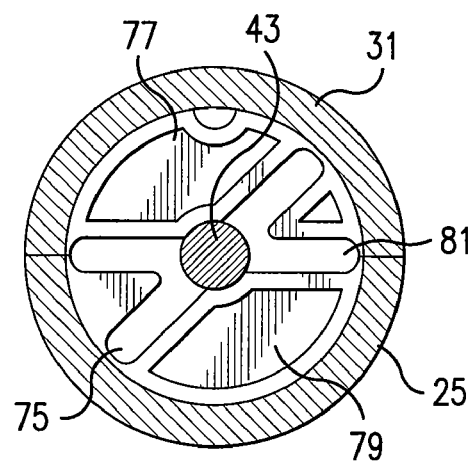
FIG. 11 is a cross sectional view of the engagement wall similar to FIG. 10, but with the first cap attached.

As seen in FIG. 5, an engagement wall 70 is located within cavity 36 proximate to drum first end 51. As seen in FIG. 11, engagement wall 70 comprises at least two locking slots, 75 and 81. Locking member 55 *m* a first end 26 and a second end 28, is formed at one end of main body member 14. Cavity 36 is formed within curved portion 25. Caps 31 and 32 are removably secured to curved portion 25 proximate to first end 26 and second end 28, respectively. Cap 31 comprises circular element 91, while cap 32 comprises circular element 92.

Groove 35 is formed between first end 26 and cap 31 on the one side, and second end 28 and cap 32 on the other side. Groove 35 is sized to accommodate neck portion 15 to permit handle member 16 to move between the first, second and third positions as described herein.

In the embodiment depicted, curved portion 25 is integrally formed as part of main body member 14; other means of securing curved portion 25 to main body member 14 are within the scope of the invention. Similarly, caps 31 and 32 are removably secured to curved portion 25 by means of screws (not shown) threaded into openings 39; covers (not shown) may be used to enclose the screws to provide a smooth outer surface of caps 31 and 32. It will be understood that caps 31 and 32 may be removably secured by other means such as snaps, a tongue-in-groove arrangement, etc. It will also be appreciated that the depicted embodiment is exemplary only, rather than limiting, and it is within the scope of the present invention that curved portion 25 and caps 31 and 32 may be replaced by a number of variations.

As shown in FIGS. 4 and 5, hinge assembly 10 comprises first collar 41 located in cavity 36 near first end 26 and second collar 42 located in cavity 36 near second end 28. Hinge bar 43 comprises a first end 44, which is secured within first collar 41, and a second end 45, which is secured within second collar 42.

Rotating drum 50, having a drum first end 51 and a drum second end 52, may be an integral part of handle 16 and is mounted on hinge bar 43. Biasing spring 60 is located on hinge bar 43 between drum second end 52 and second collar 42. As can be seen by a comparison of FIGS. 4 and 5, rotating drum 50 (and therefore handle member 16) is slidably mounted on hinge bar 43 and is movable between a first, locked position shown in FIG. 4, and a second, rotatable position shown in FIG. 5. Moving rotating drum 50 to the second, rotatable position enables the user to rotate neck portion 15 of handle member 16 through groove 35 to move handle member 16 to the different operating positions described herein. Biasing spring 60 is positioned such that it biases rotating drum 50 to the first, locked position.

A locking member 55 is formed on drum first end 51. As shown, for example, in FIG. 5, locking member 55 comprises a body portion 62 and end portions 63. In the depicted embodiment, body portion 62 is formed about hinge bar 43. Because the width of body portion 62 is less than the diameter of hinge bar 43, body portion 62 appears to be two separate pieces. It will be appreciated by those in the art that the depicted embodiment of locking member 55 is exemplary rather than limiting. For example, the width of body portion 62 may be greater than the diameter of hinge bar 43. Also, locking member 55 may solely comprise body portion 62, and not end portions 63, or solely comprise end portions 63 and not body portion 62. Finally, as described below, when cap 31 is attached to curved portion 25, locking member 55 need not extend to both sides of hinge bar 43.

As seen in FIG. 5, an engagement wall 70 is located within cavity 36 proximate to drum first end 51. As seen in FIG. 11, engagement wall 70 comprises at least two locking slots, 75 and 81. Locking member 55 may cooperate with either locking slot 75 in the second rotating position (as described in detail below) or slot 81 in the first or third rotating positions (as described in detail below). The cooperation of locking member 55 and either slot 75 or 81 will prevent rotating drum 50 from rotating about hinge bar 43. It will be obvious that multiple locking slots may be formed within engagement wall 70, where each locking slot will cooperate with locking member 55 to prevent the rotation of rotating drum 50.

Figure 10:
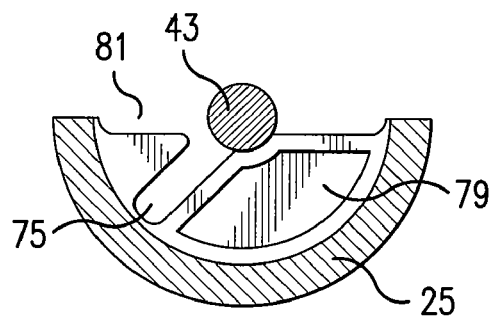
FIG. 10 is a cross sectional view of the engagement wall along lines 10—10 in FIG. 5 with the first cap removed.

As shown most clearly in FIG. 10, engagement wall 70 may be comprised of two halves, where the bottom half 79 is integrally formed from curve portion 25, and the top half 77 is integrally formed from cap 31. Bottom half 79 and top half 77 are positioned such that they form engagement wall 70.

Figure 6:
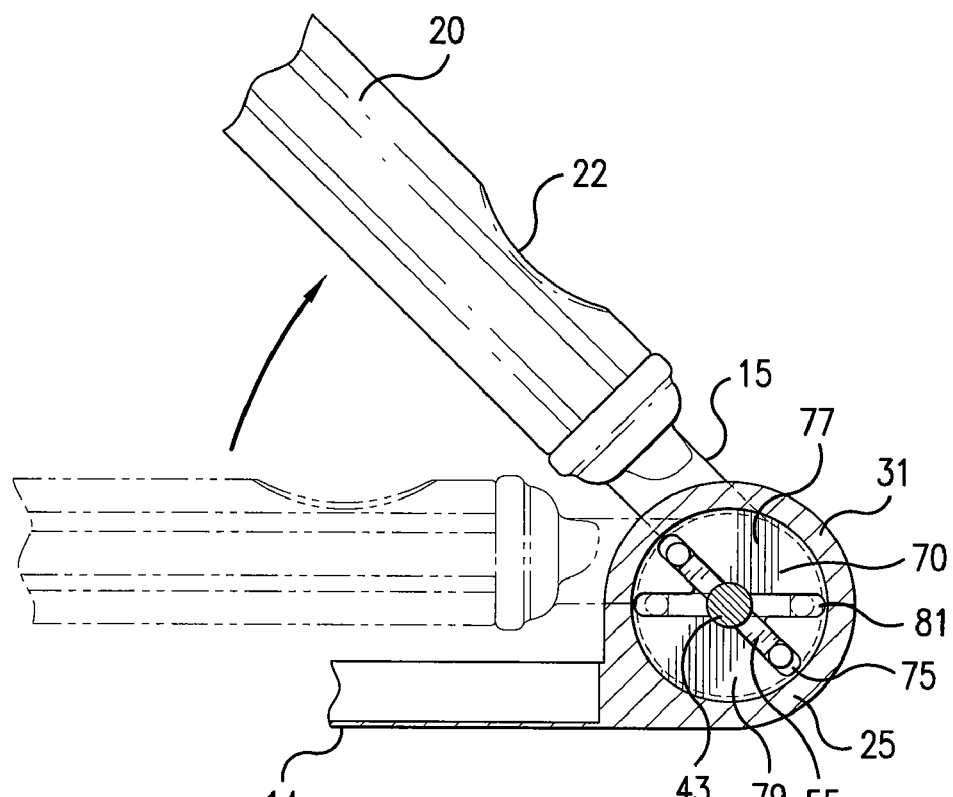
FIG. 6 is a cross sectional view of the cheese grater along the lines 6—6 in FIG. 2.

In order for food grating device 12 to operate, a force that is sufficient to overcome the force supplied by biasing spring 60 is applied, to the left as depicted in FIG. 5, to rotating drum 50 through handle member 16. In use, a user will supply this force by pressing on the end portion formed by cap 32 and end 26 with his or her thumb while grasping handle 16. This force slides rotating drum 50 to the second, rotatable position, where rotating drum 50 is free to rotate about hinge bar 43. While rotating drum 50 is in the second, unlocked position, the user rotates handle member 16 slightly toward the second rotating position, likewise revolving rotating drum 50 toward the second rotating position, as depicted in FIG. 6. When locking member 55 is no longer aligned with shelf 73, the force on handle 20 is removed. The force from biasing spring 60 will urge rotating drum 50 toward first sliding position 54, which will cause locking member 55 to abut face 74 of engagement wall 70.

As the user rotates handle member 16, and consequently rotating drum 50, toward the second rotating position, locking member 55 will slide along face 74 until it aligns with locking slot 75. When locking member 55 aligns with locking slot 75, spring 60 will urge locking member 55 to engage and cooperate with locking slot 75, allowing rotating drum 50 to return to the first, locked sliding position. As in the first rotating position, when rotating drum 50 is in the second rotating position, the cooperation of locking member 55 and locking slot 75 will prevent rotating drum 50 from rotating about hinge bar 43.

Figure 7:
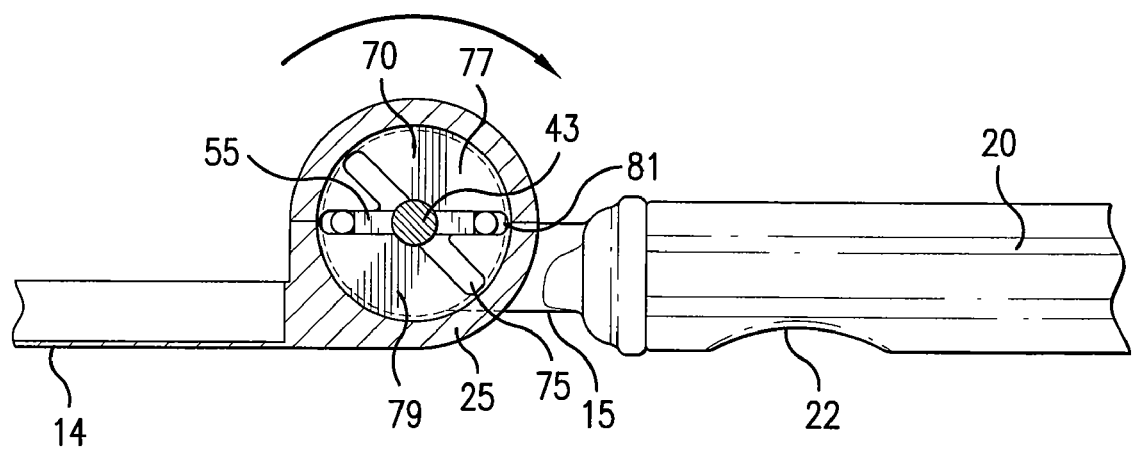
FIG. 7 is a cross sectional view of an embodiment of the present invention along the lines 7—7 in FIG. 3.
Figure 8:
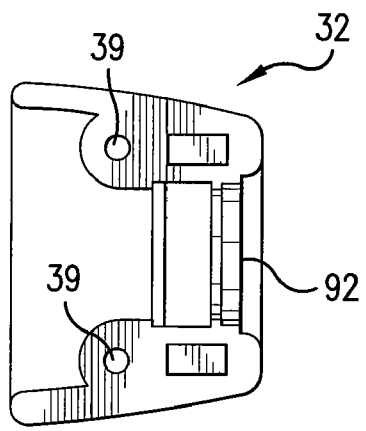
FIG. 8 is a sectional view of the second cap along lines 8—8 in FIG. 1.
Figure 9:
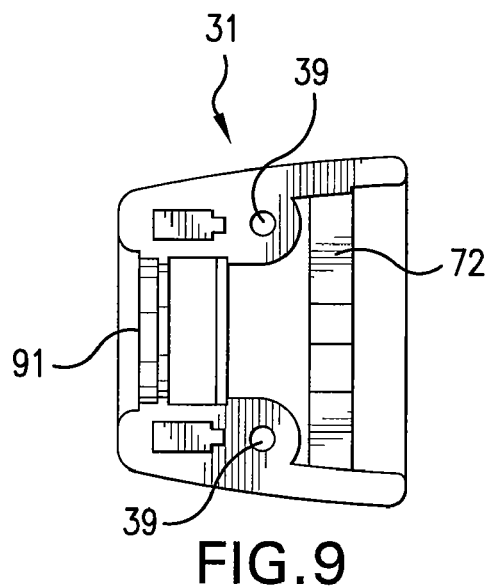
FIG. 9 is a sectional view of the first end cap along lines 9—9 in FIG. 1.

When the user once again supplies a sufficient force to rotating drum 50 through handle member 16 (again by pressing on cap 32 while grasping handle 16), rotating drum 50 slides to the second, unlocked position, where rotating drum 50 is again free to rotate about hinge bar 43. While rotating drum 50 is in this second unlocked position, the user slightly rotates handle 16 toward the third rotating position, as shown in FIG. 7. When locking member 55 is no longer aligned with locking slot 75, the force on handle member 16 is removed. The force from biasing spring 60 will again urge rotating drum 50 toward the first, locked sliding position, which will cause locking member 55 to abut face 74.

As rotating drum 50 continues to rotate, locking member 55 will slide along face 74 until it once again aligns with shelf 73, at which time biasing spring 60 will urge rotating drum 50 to return to first, locked sliding position, where shelf 73 and locking member 55 once again cooperate to prevent rotating drum 50 from rotating about hinge bar 43.

It will be appreciated by those in the art that the use of any of the rotating positions is optional and not necessary for the use of the present invention. By way of example, rotating drum 50, while in the second unlocked position, may be rotated from the first rotating position to slightly past the second rotating position before the force acting on handle member 16 is removed. In this way, rotating drum 50 may be rotated from the first rotating position directly to the third rotating position.

It will also be appreciated that more than one locking slot may be formed in engagement wall 70. Because any additional locking slots will cooperate with locking member 55 in the same way as locking slot 75, the number of additional locking slots would allow rotating drum 50 to rotate between the same number of additional rotating positions.

While specific embodiments of the invention have been described in detail, it will be appreciated by those skilled in the art that various modifications and alternatives to those details could be developed in light of the overall teachings of the disclosure. Accordingly, the particular arrangements of the food grating device and hinge disclosed are meant to be illustrative only and not limiting as to the scope of the invention which is to be given the full breadth of the appended claims and any equivalents thereof.

What is claimed is:

1. A food grating device comprising:
   a main body member;
   a handle member extending away from the main body member; and
   a hinge assembly positioned between the main body member and the handle member, wherein the hinge assembly selectively permits the handle member to rotate with respect to the main body member and, alternatively, prevents the handle member from rotating with respect to the main body member, the hinge assembly comprising:
   a housing forming a cavity;
   a rotating drum having a first side and a second side and located within the cavity, wherein the rotating drum is slidable between a first and a second sliding position and rotatable between a plurality of rotating positions;
   a locking member formed on the first side of the rotating drum; and
   an engagement wall positioned within the cavity proximate to the rotating drum first side and comprising a plurality of locking slots, wherein any of the locking slots cooperates with the locking member to prevent the rotating drum from rotating when the rotating drum is in the first sliding position, and wherein the engagement wall is dimensioned such that moving the rotating drum into the second sliding position allows the rotating drum to freely rotate within the cavity.

2. The food grating device as set forth in claim 1, wherein the main body member comprises a food grating surface.

3. The food grating device as set forth in claim 1, wherein the handle member comprises a neck portion.

4. The food grating device as set forth in claim 1, wherein the hinge assembly further comprises a biasing spring engaged to the second side of the rotating drum, wherein the biasing spring biases the rotating drum toward the first sliding position.

5. The food grating device as set forth in claim 1, wherein the hinge assembly further comprises a first cap and a second cap, wherein the first and second caps are removably engaged to the housing to enclose the cavity.

6. The food grating device as set forth in claim 5, wherein the cavity is formed in a curved portion that is engaged to the main body member.

7. The food grating device as set forth in claim 6, wherein the curved portion is integrally formed from the main body member.

8. The food grating device as set forth in claim 6, wherein the handle portion is integrally formed from the rotating drum, and wherein the handle portion rotates and slides within a groove formed between the first and second caps.

9. The food grating device as set forth in claim 8, wherein the engagement wall comprises:
   a top portion having a top slot portion and integrally formed from the first cap;
   a bottom portion having a bottom slot portion and a shelf, and integrally formed from the curved portion, wherein the bottom slot portion and top slot portion cooperate to form one of the locking slots and the shelf forms another of the locking slots.

10. The food grating device as set forth in claim 9, wherein the hinge assembly further comprises a hinge bar located within the cavity and engaged to the curved portion, wherein the rotating drum is slidingly and rotatably mounted on the hinge bar.

* * * * *

UNITED STATES PATENT AND TRADEMARK OFFICE
CERTIFICATE OF CORRECTION

PATENT NO. : 7,207,512 B2  Page 1 of 1
APPLICATION NO. : 11/424694
DATED : April 24, 2007
INVENTOR(S) : Terri Webb and Louis Chalfant It is certified that error appears in the above-identified patent and that said Letters Patent is hereby corrected as shown below:

Col. 3, line 25, replace "slots, 75 and 81. Locking members 55 m a first end 26 and a" with --slots, 75 and 81. Curved portion 25 having a first end 26 and a--.

Signed and Sealed this

Nineteenth Day of June, 2007

JON W. DUDAS
*Director of the United States Patent and Trademark Office*